Jan. 14, 1930.                J. C. DITLEVSEN                1,743,195
                              POWER OPERATED HOE
                              Filed April 21, 1928
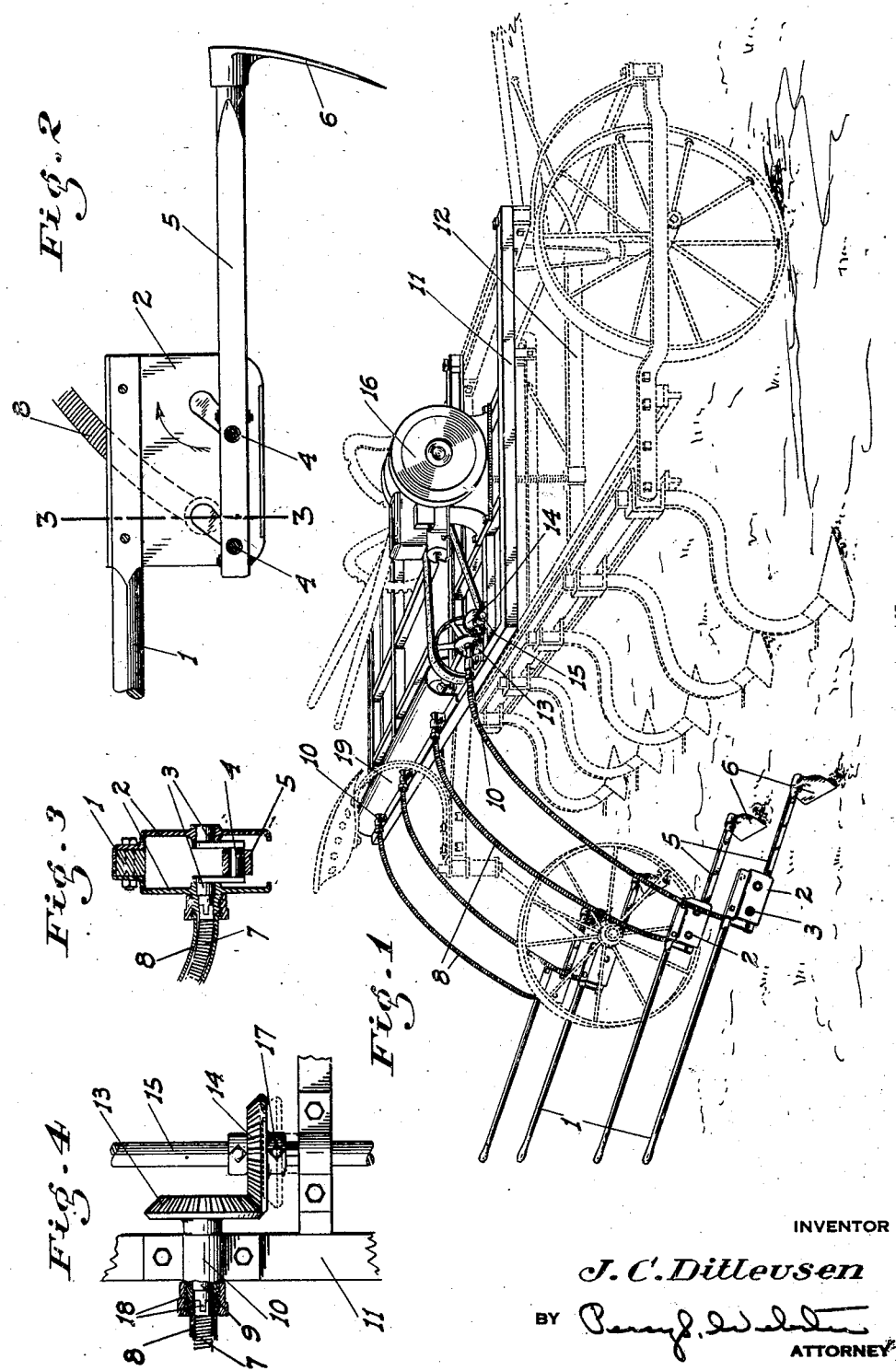
INVENTOR
J. C. Ditlevsen
BY
                                                        ATTORNEY Patented Jan. 14, 1930

1,743,195

UNITED STATES PATENT OFFICE

JENS CARL DITLEVSEN, OF ANTIOCH, CALIFORNIA

POWER-OPERATED HOE

Application filed April 21, 1928. Serial No. 271,955.

This invention relates to agricultural implements and particularly to hand controlled hoes. The principal object of my invention is to construct a hoe of this general character which is provided with driven means for reciprocating the blade through a predetermined distance without moving the handle so that the operator only needs to hold the handle stationary and manipulate the same so that the blade will be guided into place where the hoeing is to be done.

A further object is to provide driving means of such a nature that a gang of hoes may be operated simultaneously but independently of each other, and a supporting frame for the driving means especially adapted to be mounted on an ordinary cultivator in such a manner that hoeing operations may be controlled by the workers walking behind the cultivator as the latter advances over a field.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of my improved gang hoe and driving structure, mounted on a cultivator.

Fig. 2 is a longitudinal section of a hoe unit.

Fig. 3 is a cross section on the line 3—3 of Fig. 2.

Fig. 4 is a fragmentary plan view of a flexible shaft driving mechanism.

Referring now more particularly to the characters of reference on the drawings, each hoe unit comprises a rigid handle 1 of suitable length, from the lower end of which side plates 2 rigidly depend. These plates serve as bearings and supports for longitudinally spaced pairs of stub shafts 3, each pair having a centrally disposed crank 4 formed therewith between the side plates. These cranks project through and are turnable in a shank 5 which is disposed parallel to the handle under the same and extend rearwardly beyond the lower or rear end thereof.

A hoe blade 6 of suitable size and shape is rigidly attached to and depends from the rear end of the shank. A flexible shaft 7 of suitable length inclosed in a flexible housing 8 as usual is connected in driving relation with one of the shafts 3 as shown in Fig. 3.

The flexible shafts of all the hoe units of which there may be any desired number project upwardly from such units, and each shaft is connected at its upper end to a shaft 9 which is journaled in a bearing 10 mounted on a suitable rigid frame structure 11. This frame is of a size and shape so that it may be removably mounted on a cultivator 12 of standard character without affecting or interfering with the operation of the cultivator and so that the shafts all extend longitudinally of the plane of movement of said cultivator and are at the rear end thereof as shown in Fig. 1.

Bevel gears 13 on the shafts 9 mesh with bevel pinions 14 mounted in common on a transversely extending shaft 15 which is journaled on the frame structure 11 and is driven at a suitable speed from a power plant such as a gas engine 16 which is also mounted on said frame structure. The pinions 14 are preferably independently slidable on the shaft 15 a short distance as indicated in Fig. 4, so that any pinion can be unmeshed from its corresponding gear 13 when desired, being held in either position on the shaft by a set screw 17 engaging said shaft. The different sets of gears and the shaft 15 are preferably inclosed by a housing 19 so that the gears are not exposed to dirt and are not a source of danger to the operators.

It will therefore be seen that the different hoe units may be independently manipulated by workers walking behind the cultivator, and it is only necessary for such workers to securely hold and guide the handles 1 so that the hoe blades are disposed in the desired hoeing positions, without having themselves to reciprocate the handles back and forth as is the case with ordinary hoes.

Any hoe not wanted at any time may be easily removed from association with the structure by disconnecting the detachable coupling 19 provided at the upper end of the flexible shaft and housing, as shown in Fig. 4, or the hoe units may be laid upon the frame and the corresponding bevel pinion unmeshed from its gear so that the hoe blade of the idle unit will not then move back and forth.

From the foregoing description it will be readily seen that I have produced such a device as substantially fulfills the objects of the invention as set forth herein.

While this specification sets forths in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A hand guided hoe structure comprising a handle, a blade disposed beyond the lower end of the same, a shank projecting forwardly from the blade substantially parallel to the handle, longitudinally spaced cranks connected to the shanks, bearing means for the cranks supported by the handle at its lower end, and flexible drive means for rotating one of the cranks.

2. A hand guided hoe structure comprising a handle, a blade disposed beyond the lower end of the same, a shank projecting forwardly from the blade substantially parallel to the handle, under the lower end of the handle, longitudinally spaced cranks connected to the shanks, plates secured to and depending from the sides of the handle at its lower end and in which the cranks are journaled, and flexible drive means applied to one of the cranks for rotating the same.

3. A hand guided hoe structure comprising a handle, a blade associated therewith, a flexible shaft, power means applied to one end of said shaft for driving the same, connections between the other end of the shaft and the blade for reciprocating the latter lengthwise of the handle with the driving of the shaft, and supporting means for said connections secured to the handle.

In testimony whereof I affix my signature.

JENS CARL DITLEVSEN.